E. P. BONE.
HEADLIGHT.
APPLICATION FILED OCT. 27, 1916.

1,280,953.

Patented Oct. 8, 1918.
2 SHEETS—SHEET 1.

WITNESS:
George W. McAlpin
Otto Riddle

INVENTOR.
Evan P. Bone

UNITED STATES PATENT OFFICE.

EVAN P. BONE, OF NEW RICHMOND, OHIO.

HEADLIGHT.

1,280,953.
Specification of Letters Patent.
Patented Oct. 8, 1918.

Application filed October 27, 1916. Serial No. 128,126.

*To all whom it may concern:*

Be it known that I, EVAN P. BONE, a citizen of the United States, residing at New Richmond, in the county of Clermont and State of Ohio, have invented a new and useful Improvement in Headlights, of which the following is a specification.

My invention relates to devices in headlights, particularly in automobile headlights, to prevent the rays of light from blinding the eyes of persons passing in the opposite direction.

The object of my invention, in particular, is to prevent all, or nearly all, rays of light emitted by the headlight, from shining toward a passing person's eyes, and at the same time permitting the light, to near the full capacity of the lamp, to shine in a direction toward the road, sufficiently far ahead for the best road illumination.

In the present practice, the rays of light which shine toward a passing person's eyes are projected from the headlight at an angle slightly upward from the horizontal. The rays which give the best road illumination, are projected at an angle slightly downward from the horizontal. The device described herein abruptly cuts off the illumination on the horizontal plane, passing through the headlight, by eliminating practically all of the light projected upward from the horizontal, and at the same time permitting the projection of light to near the full capacity of the lamp at an angle just below the horizontal. A plane at any other angle than the horizontal, can of course, be taken as the limit of brilliant illumination; but for simplicity in description, and in accordance with the present practice, the horizontal will be considered throughout this specification.

The means to accomplish the object, consists of a device composed of a series of approximately horizontal sheets of metal, or other suitable material, and a compound lens having a series of approximately horizontal ridges on its surface. The device is placed in the front part of, and in the projected beam of, the headlight.

The sheets serve to intercept a large part of the rays of light projected at the upward angles. The ridges serve to refract downward those upward rays which are not intercepted by the sheets. The angles of the surfaces of the ridges, in relation to the spaces between the sheets, are such that the rays of greatest upward angle are given the greatest downward refraction.

All of the figures are diagrammatic cross-sections in a longitudinal vertical plane through the headlight.

Figure 1:
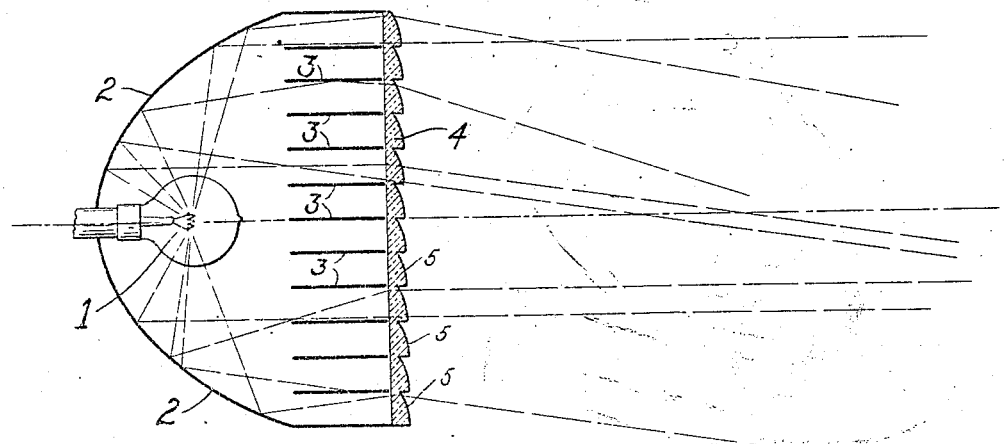
Figure 2:
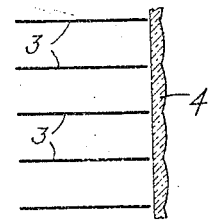
Figure 3:
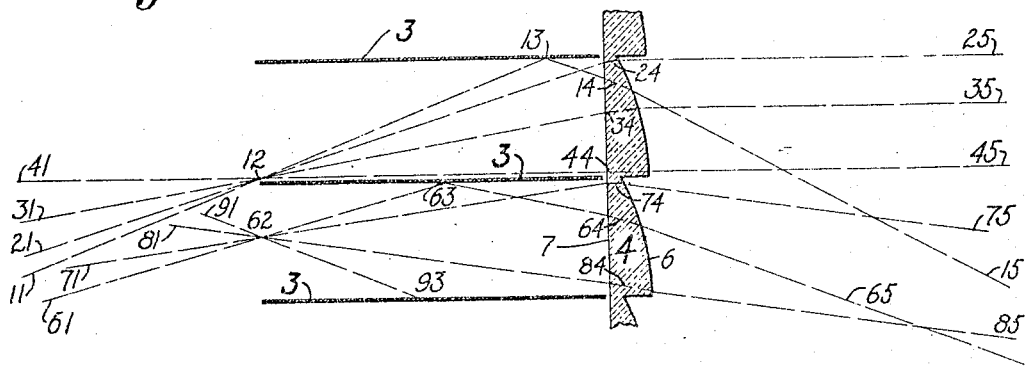
Figure 4:
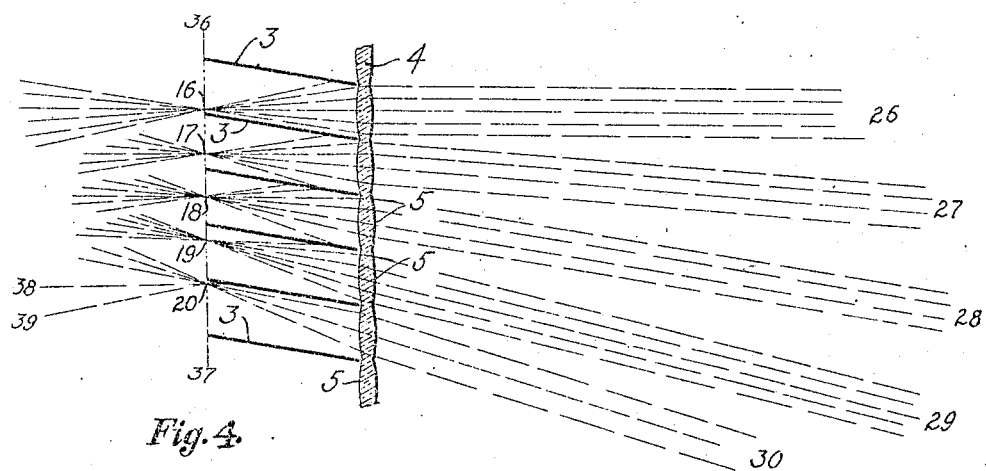

Figure 1, shows a headlight, with typical form of sheets and lenses, and some of the typical rays of light. Fig. 2, shows a few of the sheets and a part of the compound lens with a different form of ridges on the lens. Fig. 3, shows a few of the sheets and a part of the lens, in the same form as Fig. 1, but on an enlarged scale, showing, in detail, the manner in which the rays are intercepted, reflected and refracted. Fig. 4, shows a few sheets and a part of the lens, with ridges on both sides, and with the sheets at an inclined angle with the plane of the lens. This figure shows the manner in which the parallel rays are projected.

Referring to Fig. 1, the source of light is represented by 1, the reflector, usually parabolic, is represented by 2, the parallel, or near parallel, sheets by 3, 3, 3, etc., and the compound lens by 4, having the component refracting surfaces or ridges 5, 5, 5, etc. The courses of some of the typical rays of light are shown by the broken lines as emitted by the source 1, radiating to the reflector 2, thence between the sheets 3, 3, 3, and through the lens 4, where they are refracted to varying degrees, to the road ahead. The parts to which my invention particularly relates, are the sheets 3, 3, 3, and the sheets combined with the lens 4.

The sheets 3, 3, 3, are made of sheet metal or other suitable material. They are preferably approximately parallel to each other, and in planes with their outer edges inclining at a downward angle to the axis of the parabolic reflector. The plane of the sheets may, however, deviate certain amounts to suit conditions. The principal rays of light projected from different parts of the reflector, may vary from parallel and the planes of the sheets may vary to correspond. The sheets are preferably made in as true planes and as thin as practicable in order not to cut off more light than necessary. But they may be given slightly curved surfaces or have wedge shapes, where desirable for reflecting purposes.

The sheets 3, 3, 3, have preferably, mirror reflecting surfaces on their under faces and non-reflecting or absorbing surfaces on their upper faces. By experience it is sometimes found preferable to give the upper faces a surface to reflect and diffuse the light. The light reaching the eyes from this diffused reflection is not objectionable.

In vertical cross-section, as shown in Figs. 1, 2, 3 and 4, the ridges 5, 5, of lens 4, have curved surfaces. The curves are, for practical purposes, preferably arcs of circles. If the ridges deviate from the horizontal, the vertical cross-section would show elliptical curves. The ridges are spaced, as shown by the figures, so that each ridge occupies one projected space between the sheets 3, 3. The ridges may have a variety of forms. They may resemble (in vertical cross-section) a saw-tooth shape as in Figs. 1 and 3; they may have the shape of symmetrical arcs of circles as in Figs. 2 and 4; the ridges may all be on one side as in Figs. 1, 2 and 3; they may be on both sides as in Fig. 4; or, they may have many other forms. The essential feature of the curvature is, that (in the vertical plane) the radius of curvature of the ridge is such that its principal focus lies in the plane of the inner edges of the sheets, or, the practical equivalent of such. In other words, the focal lengths of the ridges, considered as lenses, are practically equal to the widths of the sheets. Then, a pencil of rays passing any point in the plane 36, 37, Fig. 4, and not intercepted by a sheet 3, results, after refraction, in a parallel beam. For example, rays passing the point 16, are parallel at 26. The feature of the focal lengths is applicable only to the lens in vertical plane, or in a plane at right angles to the plane in which the cut-off of brilliant illumination is made. Considering a horizontal plane or a plane at right angles to the plane in which the cut-off of brilliant illumination is made, the radius of curvature is immaterial. The surface, in this plane, may be straight, having an infinite radius, or it may have a very large finite radius.

Fig. 3, shows, in detail, how the rays are intercepted, reflected and refracted. Referring to the figure, all rays of light entering the spaces between the sheets 3, 3, 3, at excessively upward angles, are intercepted by the said sheets. For example, the ray 11, 12, is intercepted by the sheet 3, at 13. Ray 61, 62, is intercepted at 63. The rays which pass through the spaces between the sheets at the greatest upward angles, are always emitted from near the top of the space. For example, ray 12, 24, has greater upward angle that rays 12, 34 or 12, 44. Ray 62, 74, has a greater upward angle that ray 62, 84. Due to the angles of its surface, the lens has greater refractive power at the top of the said space than at the bottom. Therefore, the rays passing the sheets with the greatest upward angle (those emitted near the top) are the ones that are refracted downward the most; and the rays with less upward angles (those emitted lower in the space) refracted less. The result is, that the entire pencil of rays passing the space (between the sheets 3, 3) and entering at the same point, form, after refraction, a beam of parallel rays. In other words, the curvature of the ridge is such, considered as a lens, that its principal focus is at a point 12, which is in the plane passing through the inner edges of the sheets 3, 3. For example, considering the rays which pass through the point 12, ray 21, 12, 24, has the greatest possible upward angle, of any ray passing through the spaces. This ray is refracted, by the lens 4, at 24, in a horizontal direction to 25. Ray 31, 12, 34, is refracted by the lens 4, at 34, in a horizontal direction to 35. Ray 41, 12, 44, passes through the lens at 44, where the faces are parallel and there is no refraction, and continues in a horizontal direction to 45. All rays passing through the sheets and the point 12, are projected, after refraction, in a horizontal direction. There is a projection of horizontal light from the entire space between all of the sheets, or the entire face of the headlight, which results in light of great quantity. But there is no light which passes the glass at an angle above the horizontal. This gives an abrupt cut-off of light of maximum intensity, projected horizontally, to light of zero intensity, at an angle slightly above horizontal.

While the light from the lowest point 12, in the space, results in horizontal rays, light from other points at the entrance of the space, will result in parallel rays at a downward angle. Considering the light entering the spaces through a point 62, all rays which pass the sheets 3, 3, form, after refraction, a beam of parallel rays by the same explanation as above. Ray 71, 62, 74, is refracted to 75, and ray 81, 62, 84, is continued to 85, resulting in parallel rays 74, 75, and 84, 85. As the point 62, is higher in the space than point 12, the beam of parallel rays resulting therefrom has a greater downward angle than from 12.

So far, only the rays which pass the sheets, have been considered. As the bottom of the faces 3, 3, are preferably mirror surfaces, the rays of light striking these surfaces will be reflected at a downward angle and pass through the glass to the road. For example, ray 11, 12, 13, is intercepted and reflected at 13, to the point 14, where it is refracted to 15. Ray 61, 62, 63, is reflected at 63 to 64, where it is refracted to 65. As the top surfaces of the sheets 3, 3, 3, are preferably non-mirror-reflecting, rays intercepted by them are not directly reflected. For example, ray 91, 62, 93, is intercepted at 93. It has been found, in experimenting, preferable to give the top face of the sheets a surface which will not necessarily absorb the light but which will diffuse it.

In Fig. 3, as the ridges of the lens have a saw-tooth cross-section, the optical axis, or the point where the two faces are parallel and the ray is not refracted, is at the bottom of the space. In Figs. 2 and 4, the optical axes are near the middle of the space and the parallel rays will accordingly be projected in different relative directions than those of Fig. 3.

In the description of these rays of light, it has been assumed that the light from the reflector 2, of the headlight, passes any point 12, or 62, Fig. 3, and 16, 17, 18, 19 or 20, Fig. 4, through a wide angle. In practice this is not usually the case. The angle of the pencil of rays of light is limited to different conditions, as the size and position of the incandescent lamp filament 1, etc.

Fig. 4, shows the manner in which the rays of light are projected, with the ridges 5, 5, of the lens 4, having their optical axes near the center line of the spaces between the sheets 3, 3, 3. The principal focal points of the ridges lie in a plane 36, 37, which passes through the inner edges of the sheets 3, 3. The pencils of rays are shown from points, 16, 17, 18, 19 and 20. These points lie in the said plane and occupy different relative positions in the spaces. The pencil of rays from point 16, which is in the lowest part of the space, results, after refraction, in a beam 26, of parallel and horizontal rays. The pencil of rays from the point 17, which is higher in the space, results, after refraction, in a beam 27, of parallel rays which are inclined downward from the horizontal. Likewise, the pencils from 18, 19 and 20, result in parallel rays 28, 29 and 30 respectively. The higher the point is in the space, the greater is the downward inclination from the horizontal. No rays can be projected at an angle inclined upward from the horizontal (26). Suppose that the point 16 be moved downward, which movement would tend to incline the parallel beam 26, upward. The pencil of rays would be immediately intercepted by the sheet 3, preventing all light from the point being projected toward the upper space. The point 20, is in a position just below a sheet, showing how rays 38, 20, and 39, 20, are prevented, by a sheet 3, from entering the space just above. In order to avoid confusion, the rays intercepted by the lower faces of the sheets 3, are not shown as reflected.

As stated before, the horizontal has been considered as the direction of light which is the upper limit. Any other desired direction can, of course, be considered for the same purpose.

While the combination of the sheets and ridged lens, as described herein, prevents entirely, any rays in an upward direction, the sheets alone make certain approximations toward that end. They diminish materially the glare in the eyes of a passing person. My improvement is, therefore, not limited to the combination of the sheets and lens.

Fig. 4, shows the device, without the ridges on the lens 4, and in which the sheets 3, 3, alone are used to prevent the light from projecting in an upward direction. Some of the typical rays are shown which display the manner in which no ray can pass between the sheets 3, 3, at an angle inclined above the horizontal, or any other given plane.

I do not wish to confine my invention to the details of the device described herein, as other equivalent means may serve the same purpose.

The term "lens" has been used throughout these specifications for the refracting medium. This may be considered as a compound lens or a collection of independent lenses. Each ridge on the glass is a form of lens in itself.

The term "non-mirror-reflecting" is used for the preferred surface for the tops of the sheets. This is intended to mean a surface which does not necessarily absorb but which may diffuse the light. It does not reflect as a mirror or truly plane surface.

What I claim as new, and desire to secure by Letters Patent, is:—

1. In a headlight, the combination with a source of light, of a compound lens disposed in front of said source, the component parts of said lens comprising a series of substantially similar refracting media, and means located between said source of light and said lens, and arranged to coöperate with said refracting media, so that rays of light may be projected from said lens within a predetermined angle.

2. In a headlight, the combination with a source of light, of a plurality of sheets, said sheets being arranged in front of said source and disposed to intercept certain of the rays of light therefrom, and a compound lens disposed in front of said sheets, said lens being provided with a series of substantially similar refracting surfaces between the projected planes of said sheets.

3. In a headlight, the combination with a source of light, of a plurality of sheets, said sheets being arranged in front of said source and disposed to intercept certain of the rays of light therefrom, and a compound lens disposed in front of said sheets, said lens being provided with a series of substantially similar cylindrical refracting surfaces between the projected planes of said sheets.

4. In a headlight, the combination with a source of light, of a plurality of sheets, said sheets being arranged in front of said source and disposed to intercept certain of the rays of light therefrom, and a compound lens in front of and adjacent to said sheets, with the component parts of said lens disposed between the projected planes of said sheets, and said component parts having principal focal points in the plane passing through the inner edges of said sheets.

5. In a headlight, the combination with a source of light, of a plurality of sheets, said sheets being arranged in front of said source and disposed to intercept certain rays of light therefrom, one surface of each of said sheets being arranged to reflect the rays of light intercepted thereby, and a compound lens disposed in front of said sheets, said lens being provided with a series of substantially similar refracting surfaces between the projected planes of said sheets.

6. In a headlight, the combination with a source of light, of a plurality of sheets, said sheets being arranged in front of said source and disposed to intercept certain rays of light therefrom, one surface of each of said sheets being arranged to reflect the rays of light intercepted thereby, the other surface of each sheet being non-mirror-reflecting to light, and a compound lens disposed in front of said sheets, said lens being provided with a series of substantially similar refracting surfaces between the projected planes of said sheets.

Signed at New Richmond, Ohio, October 26th, 1916.

EVAN P. BONE.

Witnesses:
GEORGE W. McALPIN,
OTTO RIDDLE.